United States Patent
Kurisu

(10) Patent No.: US 11,277,554 B2
(45) Date of Patent: Mar. 15, 2022

(54) CONTROL APPARATUS, IMAGING APPARATUS, CONTROL METHOD, AND STORAGE MEDIUM

(71) Applicant: CANON KABUSHIKI KAISHA, Tokyo (JP)

(72) Inventor: Hiroaki Kurisu, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 16/715,246

(22) Filed: Dec. 16, 2019

(65) Prior Publication Data

US 2020/0228721 A1 Jul. 16, 2020

(30) Foreign Application Priority Data

Jan. 10, 2019 (JP) .............................. JP2019-002255

(51) Int. Cl.
*H04N 5/232* (2006.01)
*G03B 13/36* (2021.01)

(52) U.S. Cl.
CPC ....... *H04N 5/232121* (2018.08); *G03B 13/36* (2013.01); *H04N 5/232125* (2018.08); *H04N 5/232127* (2018.08)

(58) Field of Classification Search
CPC .............................................. H04N 5/232127
USPC .................................................. 348/345, 349
See application file for complete search history.

(56) References Cited

U.S. PATENT DOCUMENTS

| | | | | |
|---|---|---|---|---|
| 8,866,942 B2* | 10/2014 | Sugimoto | .............. | H04N 5/202 348/254 |
| 2007/0086767 A1* | 4/2007 | Nakai | ................... | G03B 13/34 396/101 |
| 2010/0315514 A1* | 12/2010 | Uchida | ............ | H04N 5/232123 348/187 |
| 2013/0016245 A1* | 1/2013 | Yuba | ................ | H04N 5/232123 348/222.1 |
| 2013/0201386 A1* | 8/2013 | Ohbuchi | ............ | H04N 5/23212 348/349 |
| 2013/0335619 A1* | 12/2013 | Itoh | .................. | H04N 5/232123 348/349 |
| 2014/0198246 A1* | 7/2014 | Ono | ........................ | G02B 7/282 348/353 |
| 2014/0327812 A1* | 11/2014 | Shuda | .............. | H04N 5/232123 348/353 |
| 2017/0276902 A1* | 9/2017 | Umezawa | ................. | G02B 7/09 |
| 2018/0120534 A1* | 5/2018 | Mohri | .................... | G03B 13/36 |
| 2019/0387175 A1* | 12/2019 | Kikuchi | ................ | G03B 13/36 |

FOREIGN PATENT DOCUMENTS

JP 2007-65048 A 3/2007

\* cited by examiner

*Primary Examiner* — Anthony J Daniels
(74) *Attorney, Agent, or Firm* — Cowan, Liebowitz & Latman, P.C.

(57) ABSTRACT

A control apparatus includes a determination unit configured to determine whether or not a point light source area exists in an image, and a focus control unit configured to perform a focus control based on an evaluation value sequentially acquired from the image while moving the focus lens. The focus control unit changes a method of the focus control based on a position of the point light source area.

16 Claims, 8 Drawing Sheets

CONTROL APPARATUS, IMAGING APPARATUS, CONTROL METHOD, AND STORAGE MEDIUM

BACKGROUND OF THE INVENTION

Field of the Invention

The present invention relates to an imaging apparatus that provides an autofocus ("AF") control.

Description of the Related Art

There is conventionally known an imaging apparatus that performs an autofocus control (contrast type AF control) using a contrast evaluation value. In the contrast type AF control, when a contrast evaluation value is acquired for a bright object in a low-brightness environment such as a night scene or a point light source, the maximum value of the contrast evaluation value is detected at a focus position different from the in-focus position. As a result, so-called false or spurious focusing occurs in which the focus position different from the actual in-focus position is erroneously detected as the in-focus position.

Japanese Patent Laid-Open No. ("JP") 2007-65048 discloses an imaging apparatus that detects a point light source area for each AF frame, and changes an exposure setting when detecting the point light source area, such that the brightness of the AF frame having the highest luminance level is appropriate.

However, the imaging apparatus disclosed in JP 2007-65048 lowers the signal level of the main object and the focus accuracy, when the main object that the user wants to focus on exists at a position different from the point light source area.

SUMMARY OF THE INVENTION

The present invention provides a control apparatus, an imaging apparatus, a control method, and a storage medium, each of which can focus on a main object with high accuracy when a point light source area exists.

A control apparatus according to one aspect of the present invention includes a determination unit configured to determine whether or not a point light source area exists in an image, and a focus control unit configured to perform a focus control based on an evaluation value sequentially acquired from the image while moving the focus lens. The focus control unit changes a method of the focus control based on a position of the point light source area. At least one processor or circuit is configured to perform a function of at least one of the units.

An imaging apparatus including the above control apparatus, a control method corresponding to the control apparatus, and a storage medium storing a program that enables a computer to execute this control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1:
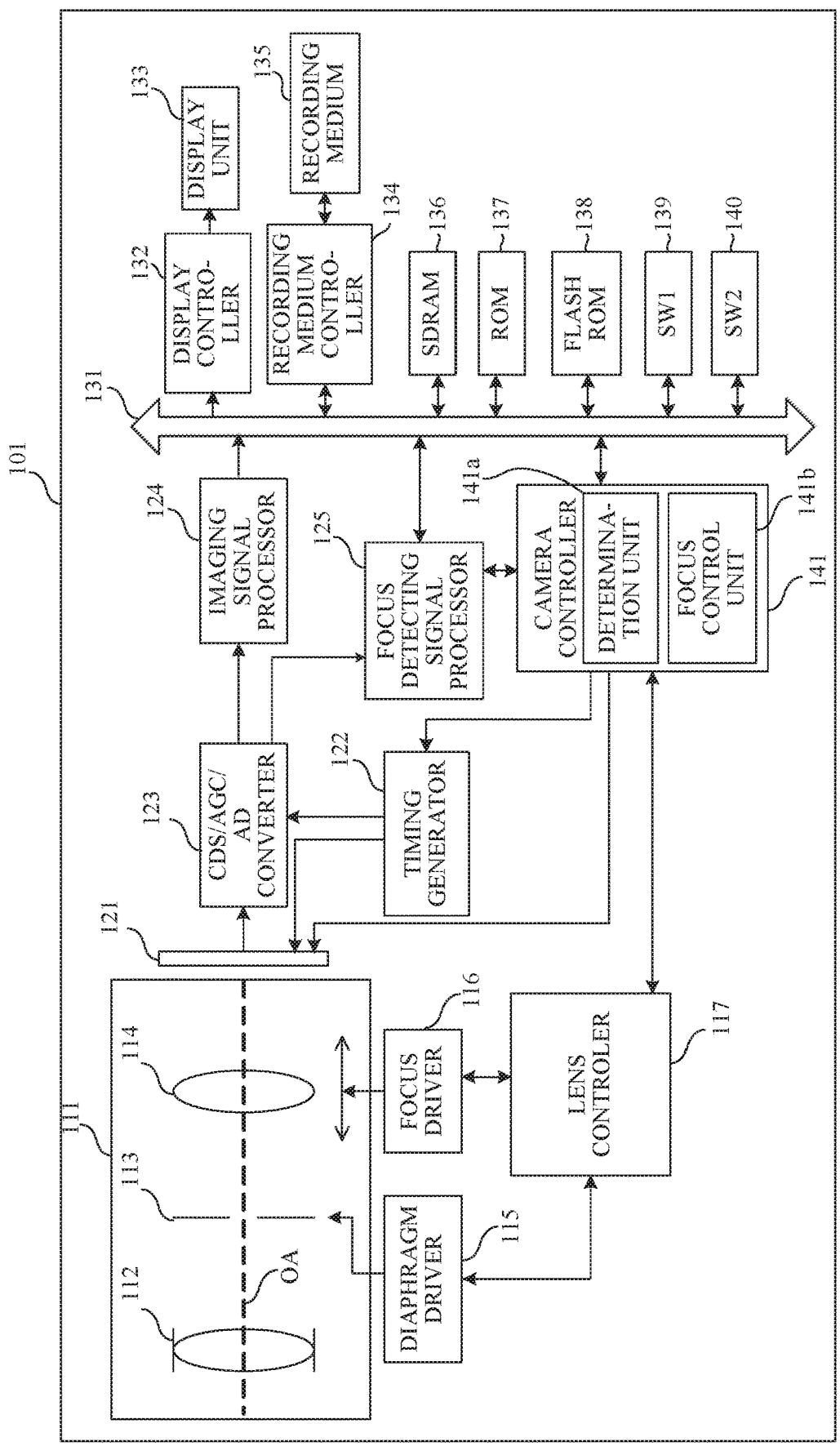
FIG. 1 is a block diagram of an imaging apparatus according to each embodiment.

Referring now to FIG. 1, a description will be given of a configuration of an imaging apparatus 101 according to a first embodiment of the present invention. FIG. 1 is a block diagram of the imaging apparatus 101. The imaging apparatus 101 includes a lens unit (imaging optical system) 111. In this embodiment, the imaging apparatus 101 is integrated with the lens unit 111, but is not limited to this embodiment. The present invention is also applicable to an imaging system that includes an imaging apparatus (camera body) and a lens unit (interchangeable lens) that is attachable to and detachable from the camera body.

The lens unit 111 includes a fixed lens 112, a diaphragm (aperture stop) 113, and a focus lens 114. A lens controller 117 drives the diaphragm 113 using a diaphragm driver 115 to adjust an aperture diameter of the diaphragm 113 and thereby a light amount during imaging. The lens controller 117 determines a driving amount for driving the focus lens 114 in the lens unit 111 using the focus driver 116. The lens controller 117 provides focusing (performs a focus control) by driving the focus lens 114 in a direction along an optical axis OA (optical axis direction) using the focus driver 116. An autofocus control (AF control) is realized through a moving control of the focus lens 114 by the focus driver 116. The focus lens 114 is a focusing lens, and is simply illustrated as a single lens in FIG. 1, but usually includes a plurality of lenses. The diaphragm driver 115 and the focus driver 116 are controlled by the lens controller 117.

A light beam incident through the lens unit 111 forms an image on a light receiving surface of an image sensor 121 and is converted into an electric signal by the image sensor 121. The image sensor 121 is a photoelectric conversion element that photoelectrically converts an object image (optical image) formed via the lens unit 111, and is configured by a CCD sensor or a CMOS sensor. The signal charge accumulated in the photoelectric conversion element is sequentially read out of the image sensor 121 as a voltage signal corresponding to a signal charge based on a drive pulse output from a timing generator 122.

A CDS/AGC/AD converter 123 performs correlated double sampling for removing a reset noise, controls a sensor gain, and digitizes the image signal and focus detection signal read out of the image sensor 121. The CDS/AGC/AD converter 123 outputs the imaging signal to an imaging signal processor 124 and the focus detection signal to a focus detecting signal processor 125, respectively. The focus detecting signal may include a contrast evaluation value indicating the contrast of the object or the number of high-luminance pixels indicating the number of output pixels equal to or larger than a predetermined value in the frame. The focus detecting signal processor 125 sets and arranges focus detection areas for performing a focus detection in the captured image. This embodiment sets totally thirty-five frames of seven horizontal frames and five vertical frames as the focus detection areas, but the number and array of frames is not limited to this example.

The imaging signal processor 124 stores the imaging signal output from the CDS/AGC/AD converter 123 in an SDRAM 136 via a bus 131. The image signal stored in the SDRAM 136 is read out of a display controller 132 via the bus 131 and displayed on a display unit 133. In the operation mode for recording the imaging signal, the image signal stored in the SDRAM 136 is recorded on a recording medium 135 by a recording medium controller 134.

A ROM 137 stores a control program executed by a camera controller (control apparatus) 141, various data necessary used for the control, and the like. A flash ROM 138 stores various setting information relating to the operation of the imaging apparatus 101 such as user setting information.

Reference numeral 139 denotes a switch (SW1) for performing an imaging standby operation (imaging preparation) such as an AF and an AE, and reference numeral 140 denotes a switch (SW2) for performing imaging after the switch (SW1) is operated. AE stands for an autoexposure control. Based on the pixel signal level of the image data temporarily stored in the SDRAM 136, the camera controller 141 temporarily determines the F-number of the diaphragm 113, the accumulation time of the image sensor 121, the gain setting value of the CDS/AGC/AD converter 123, and the setting value of the timing generator 122. The camera controller 141 transmits to the lens controller 117 driving amounts (focus drive amounts) of the focus lens 114 for focus driving (scan operation) used to detect the in-focus position and for focus driving up to the in-focus position. The lens controller 117 can provide the AF by transmitting the focus drive amount to the focus driver 116.

In this embodiment, the camera controller 141 includes a determination unit 141*a* and a focus control unit 141*b*. The determination unit 141*a* determines whether or not a point light source (point light source area) exists in the image (image signal). The focus control unit 141*b* performs a focus control based on evaluation values (contrast evaluation values) sequentially acquired from the image while moving the focus lens 114. The focus control unit 141*b* changes the method of the focus control based on the position of the point light source area.

Figure 2:
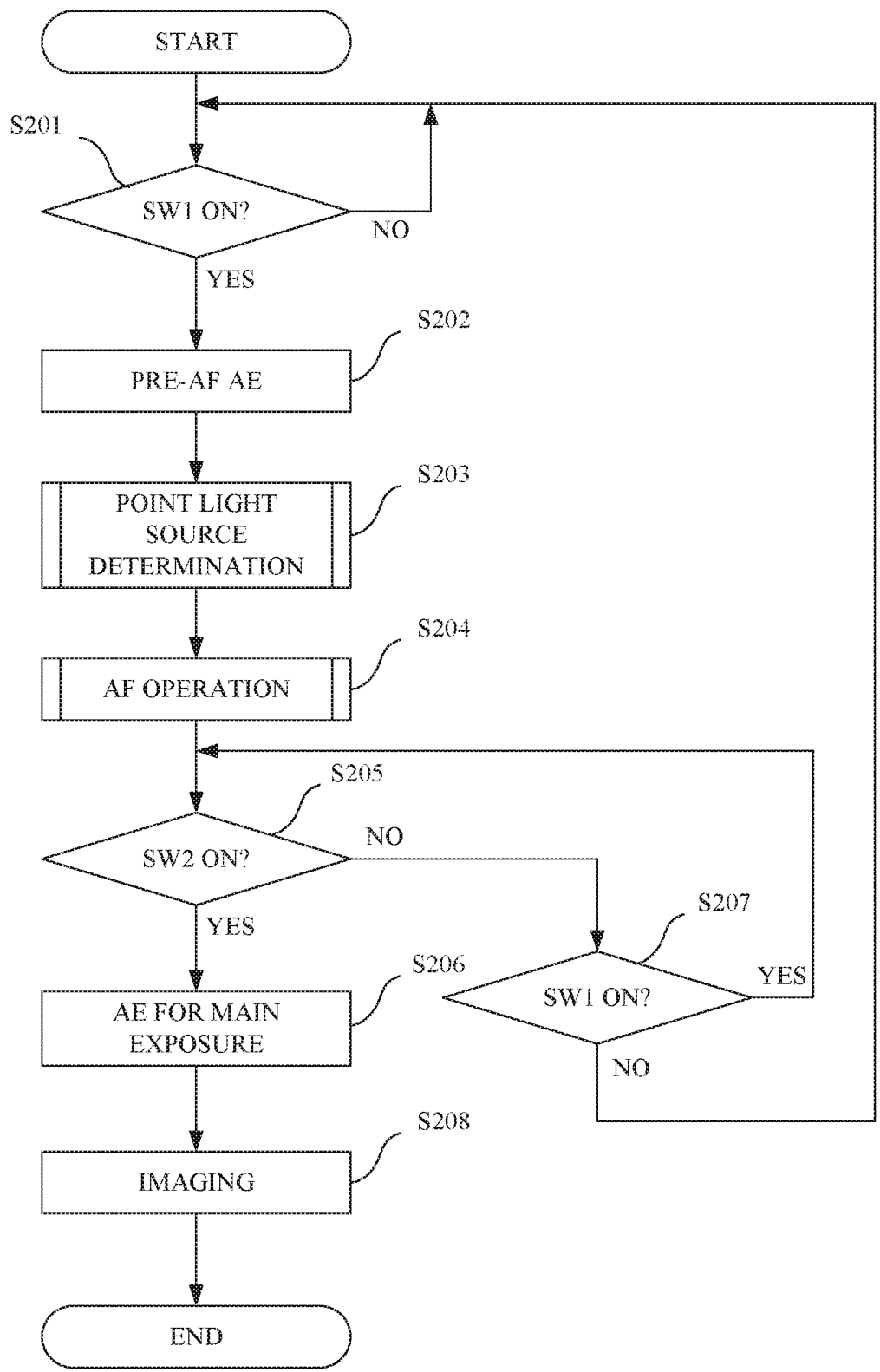
FIG. 2 is a flowchart illustrating an imaging operation according to each embodiment.

Referring now to FIG. 2, a description will be given of an imaging operation of the imaging apparatus 101 according to this embodiment. FIG. 2 is a flowchart illustrating the imaging operation. Each step in FIG. 2 is mainly executed according to a command from the camera controller 141.

Initially, in the step S201, the camera controller 141 determines whether or not the switch (SW1) 139 is pressed. If the switch (SW1) 139 is not pressed, the step S201 is repeated. On the other hand, when the switch (SW1) 139 is pressed, the flow proceeds to the step S202. In the step S202, the camera controller 141 performs the AE for the AF (pre-AF AE).

Next, in the step S203, the camera controller 141 performs a point light source determination. Details of the point light source determination will be described later. Next, in the step S204, the camera controller 141 performs an AF operation. Details of the AF operation will be described later. In the step S205, the camera controller 141 determines whether the switch (SW2) 140 is pressed. If the switch (SW2) is not pressed, the flow proceeds to the step S207. In the step S207, the camera controller 141 determines whether the switch (SW1) 139 is pressed. If the switch (SW1) 139 has not been pressed, the flow returns to the step S201. On the other hand, when the switch (SW1) 139 is pressed, the flow returns to the step S205.

On the other hand, if the switch (SW2) 140 is pressed in the step S205, the flow proceeds to the step S206. In the step S206, the camera controller 141 performs the AE for the main exposure so as to acquire a captured image. Next, in the step S208, the camera controller 141 performs imaging processing and ends this flow.

Referring now to FIGS. 3A to 3E, a description will be given of a cause of the false focusing for the point light source (point light source object, point light source area). FIGS. 3A to 3E explain the false focusing by the point light source. The point light source determination processing (step S203 in FIG. 2) is processing for determining whether or not the point light source (point light source area) exists in the AF frame (focus detection area). If determining that the point light source exists, the camera controller 141 can focus on the point light source with high accuracy by switching the AF method to a point light source AF. The point light source AF is to limit the focus driving range in the scan operation for searching for the in-focus position to a predetermined range (such as the infinity side).

Figure 3A:
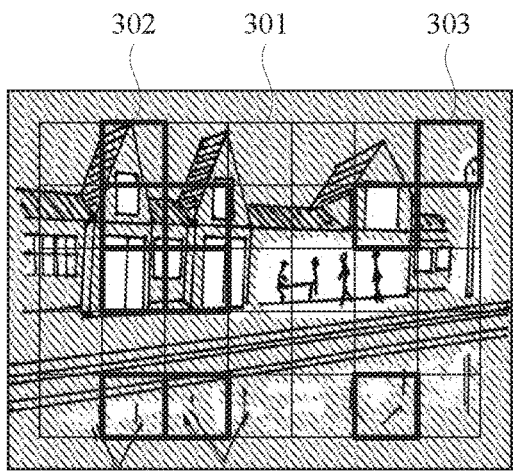
FIGS. 3A to 3E explain false focusing by a point light source according to each embodiment.
Figure 3B:
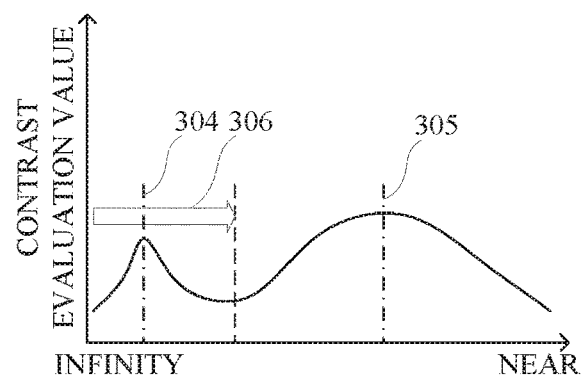

In the imaging scene illustrated in FIG. 3A, reference numeral 301 indicated by a thin line represents 7×5 AF frames, and reference numeral 302 indicated by a thick line represents AF frames in each of which a point light source exists. When the scan operation is made in this imaging scene, the change in the contrast evaluation value of an upper right AF frame 303 is as illustrated in FIG. 3B. In FIG. 3B, the abscissa axis denotes a focus position (a larger numerical value (right side) approaches to a near direction, and a smaller numerical value (left side) approaches to an infinity direction), and an ordinate axis denotes a contrast evaluation value acquired by the focus detecting signal processor 125. A centerline 304 represents the best focus position (in-focus position) in this imaging scene. However, since the contrast evaluation value tends to increase when the point light source is blurred to the near side, a false mountain appears with a contrast evaluation value such as a centerline 305. The AF operation basically gives a priority to the object on the near side, and erroneously focuses on the peak position of the centerline 305 for the point light source, causing the false focusing. Accordingly, this embodiment limits the focus driving range (the movable range of the focus lens 114) to the predetermined range (first movable range) 306 in the scan operation, and thereby prevents the centerline 305 from being focused.

Figure 3C:
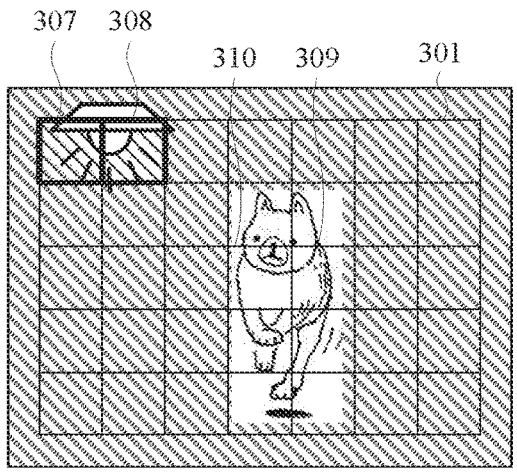
Figure 3D:
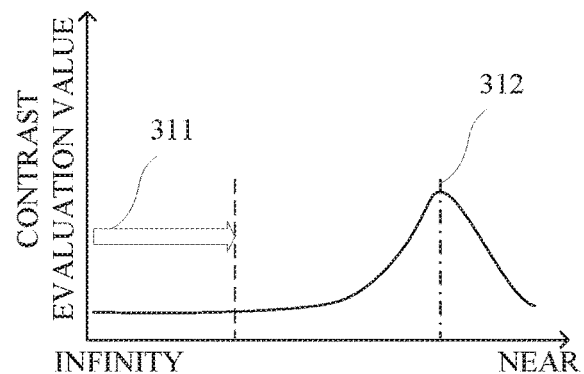

However, in the imaging scene as illustrated in FIG. 3C, the user cannot focus on the object intended by the user. In the imaging scene of FIG. 3C, the point light source exists in upper left AF frames 307 and 308, and a main object 309 exists near the center. FIG. 3D illustrates a change in contrast evaluation value of the center AF frame 310 in the imaging scene in FIG. 3C. In FIG. 3D, the abscissa axis indicates a focus position, and the ordinate axis indicates a contrast evaluation value. In the imaging scene in FIG. 3C, since a point light source exists as in FIG. 3A, the focus driving range is narrowed (restricted) to a predetermined range (first movable range) 311. However, the predetermined range 311 does not include the focus position (focus position) 312 of the main object 309. Therefore, the focus shifts and causes non-focus or blurred focus.

Figure 3E:
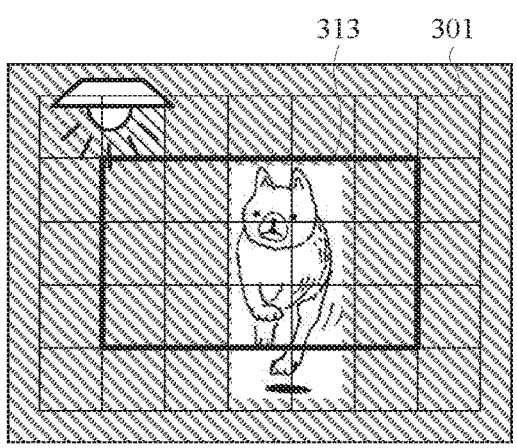

Accordingly, the camera controller 141 in this embodiment changes the scan operation method (AF control method) in accordance with the position of the AF frame where the point light source exists. In other words, the camera controller 141 sets a first area 313 to the central 5×3 frame of the 7×5 AF frames 301, as illustrated in FIG. 3E. Then, when the point light source exists in the first area 313, the camera controller 141 provides focusing by limiting the focus driving range of the scan operation to a predetermined range (point light source AF). On the other hand, when the point light source exists only outside the first area (the area excluding the first area 313 in the AF frame 301 or the second area), the camera controller 141 provides focusing without using the AF frame result in which the point light source exists (point light source exclusion AF). Thereby, the false focusing with the AF frame in which the point light source exists can be prevented. This processing can solve the problem that the main object near the center cannot be focused due to the disturbance of the surrounding AF frame.

Figure 4:
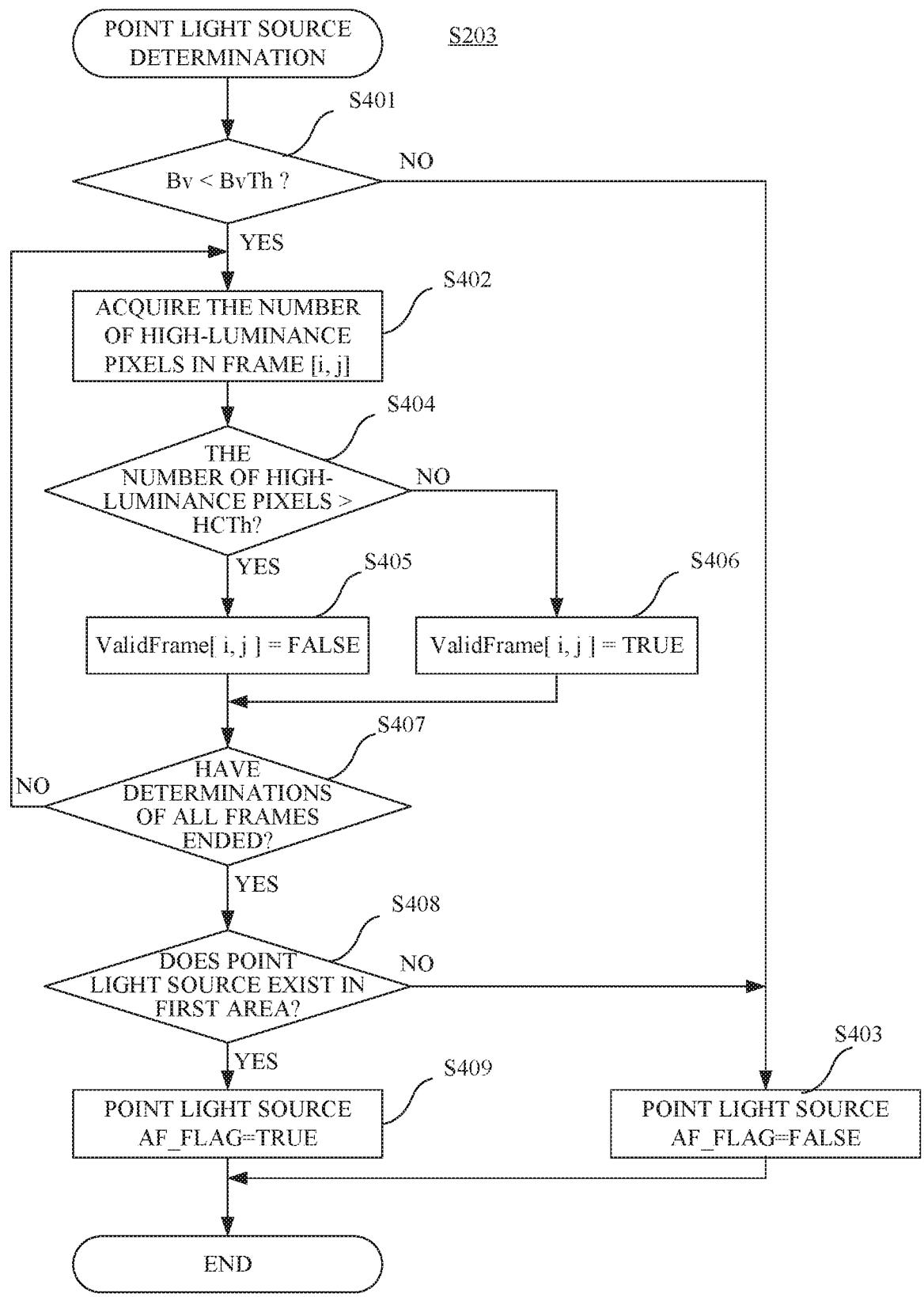
FIG. 4 is a flowchart illustrating point light source determination processing according to each embodiment.
Figure 5A:
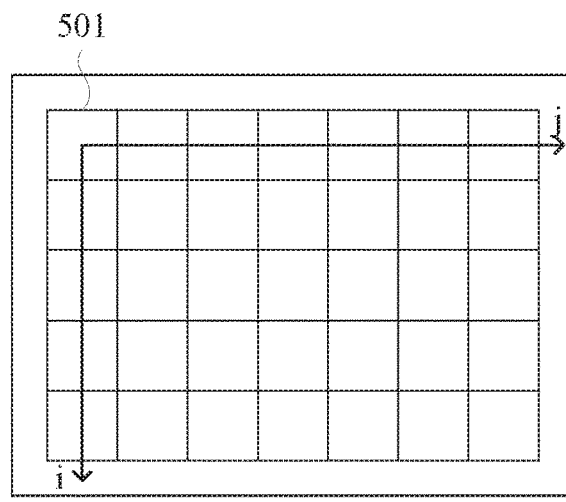
FIGS. 5A to 5C explain AF frame setting and point light source determination processing according to the first embodiment.
Figure 5B:
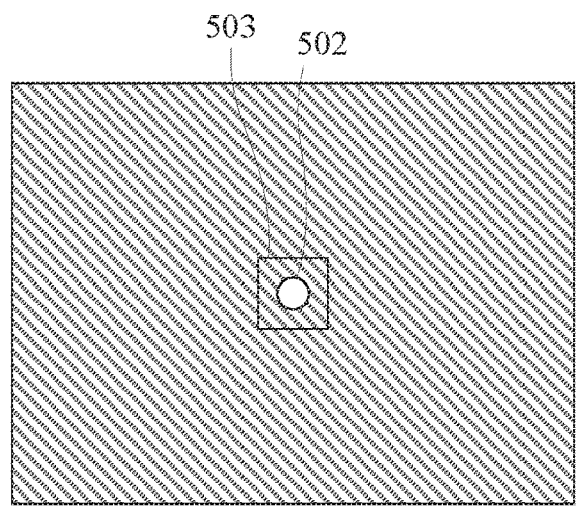
Figure 5C:
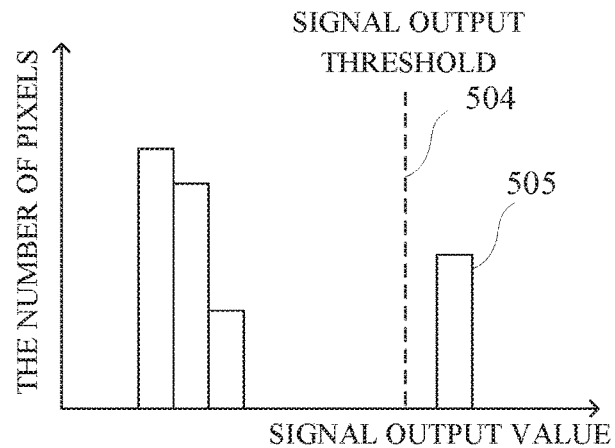

Referring now to FIGS. 4 and 5A-5C, a description will be given of the point light source determination processing (step S203). FIG. 4 is a flowchart illustrating the point light source determination processing. Each step in FIG. 4 is mainly executed by the camera controller 141. FIGS. 5A-5C explain the AF frame setting and point light source determination processing.

Initially, in the step S401, the camera controller 141 determines whether or not a By value is equal to or higher than a predetermined threshold BvTh. The By value is a value (luminance value) indicating the luminance of the object. The camera controller 141 calculates the By value based on the signal amount acquired by the image sensor 121. Basically, an imaging scene in which a point light source cannot be properly focused is often a scene where a bright object exists in a dark environment. When the By value is smaller than the predetermined threshold BvTh in the step S401, the flow proceeds to the step S402. On the other hand, if the By value is equal to or higher than the predetermined threshold BvTh in the step S401, the camera controller 141 proceeds to the step S403 without the point light source determination processing because the false focusing is less likely even if the point light source exists. In the step S403, the camera controller 141 sets the point light source AF_FLAG to FALSE and ends this flow.

In the step S402, the camera controller 141 acquires the number of high-luminance pixels for each frame (AF frame). Herein, a frame [i, j] means an i-th frame in the vertical direction and a j-th frame in the horizontal direction from a upper left frame 501 as illustrated in FIG. 5A. The number of high-luminance pixels is the number of pixels having a signal output equal to or higher than a predetermined value (the luminance value equal to or higher than a predetermined luminance value). FIG. 5B illustrates an imaging scene in which a point light source (point light source area) 502 exists in an AF frame 503. FIG. 5C illustrates a relationship between the signal output value of the AF frame 503 and the number of pixels in the imaging scene in FIG. 5B. In FIG. 5C, the abscissa axis represents a signal output value, and the ordinate axis represents the number of pixels. The area of the point light source 502 in the AF frame 503 is bright, but the area other than the point light source 502 in the AF frame 503 is dark. Hence, the signal output value is bipolar as illustrated in FIG. 5C.

Next, in the step S404 in FIG. 4, the camera controller 141 determines whether or not the number of high-luminance pixels (the total number of pixels 505 exceeding a signal output threshold 504) exceeds a predetermined threshold HCTh. If the number of high-luminance pixels is larger than the predetermined threshold value HCTh in the step S404, the camera controller 141 determines that the point light source (point light source area) exists in the frame [i, j], and proceeds to the step S405. In the step S405, the camera controller 141 sets ValidFrame [i, j] to FALSE. ValidFrame is an array indicating whether the frame is effective as an AF frame. On the other hand, if the number of high luminance pixels is smaller than the predetermined threshold value HCTh in the step S404, the camera controller 141 determines that there is no point light source in the frame [i, j], and proceeds to step S406. In the step S406, the camera controller 141 sets ValidFrame [i, j] to TRUE.

Next, in the step S407, the camera controller 141 determines whether or not the point light source determination has been completed for all frames. If there is a frame that has not yet undergone the point light source determination, the flow returns to the step S402, and the camera controller 141 performs the point light source determination for the next frame. On the other hand, when the point light source determination is completed for all the frames, the flow proceeds to the step S408.

In the step S408, the camera controller 141 determines the number and position of frames in which the point light sources are detected (point light sources exist). In other words, the camera controller 141 determines whether or not to perform the point light source AF depending on whether or not the point light source exists in the first area, as described above.

When one or more frames satisfy ValidFrame [i, j]=FALSE, the conventional flow may proceed from the step S408 to the step S409, and the point light source AF_FLAG is set to TRUE to perform the point light source AF. On the other hand, in this embodiment, when a frame satisfying ValidFrame [i, j]=FALSE (frame having the point light source) exists in a predetermined area (first area), the flow proceeds from the step S408 to the step S409 to perform the point light source AF by setting the light source AF_FLAG to TRUE. This embodiment sets the predetermined area (first area) to the central 5×3 frame among the plurality of AF frames, but is not limited to this example. This embodiment may set a predetermined area according to the ratio to the angle of view, or set a predetermined area according to the position of the object. On the other hand, if the frame having the point light source does not exist in the predetermined area in the step S408, the flow proceeds to the step S403. In the step S403, the camera controller 141 sets the point light source AF_FLAG to FALSE and ends this flow.

Figure 6:
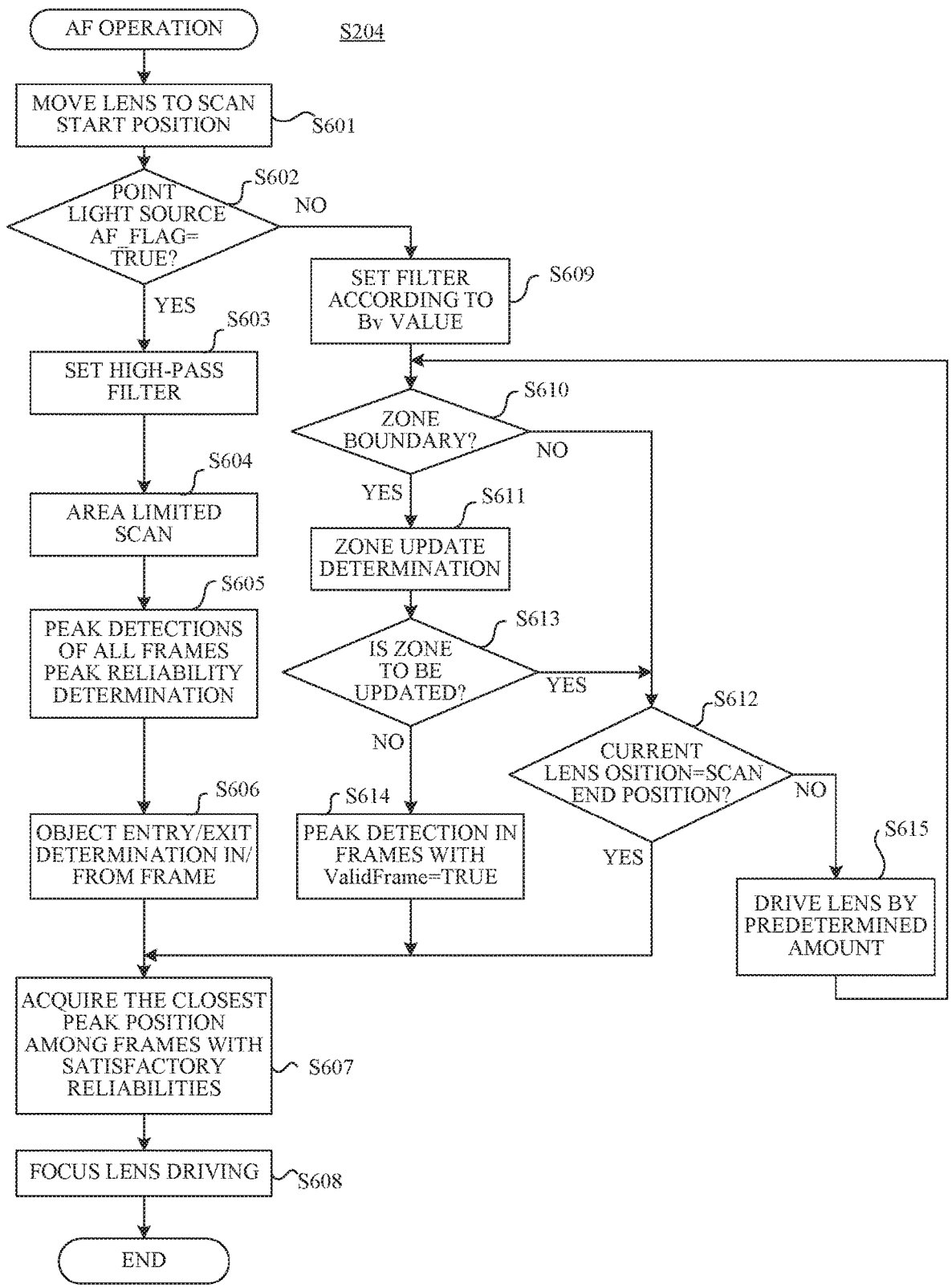
FIG. 6 is a flowchart illustrating an AF operation according to each embodiment.

Referring now to FIG. 6, a description will be given of the AF operation (step S204). FIG. 6 is a flowchart illustrating the AF operation. Each step in FIG. 6 is mainly executed by the camera controller 141.

Initially, in the step S601, the camera controller 141 moves the focus lens 114 to a scan start position in order to perform the scan operation. This embodiment sets the lens end on the infinity side to the scan start position, but the present invention is not limited to this embodiment and may set the last focus position or the lens end on the closest side to the start position.

Next, in the step S602, the camera controller 141 confirms the point light source_FLAG. The point light source_FLAG is determined by the point light source determination processing (step S203) illustrated in the flowchart in FIG. 4. When the point light source_FLAG is TRUE, the flow proceeds to the step S603 to perform the point light source AF. In the step S603, the camera controller 141 sets a high-pass filter (a filter that extracts a frequency component in the first band) to the focus detecting signal processor 125. Setting the high-pass filter enables a component having a high spatial frequency to be acquired. At this time, it becomes easy to be affected by a noise, but the focus accuracy improves for the point light source.

Next, in the step S604, the camera controller 141 performs an area limited scan. As described above, the area limited scan is a scan performed by limiting the scanning range to a predetermined range on the infinity side without acquiring a contrast evaluation value on the closest side. This embodiment previously converts the predetermined area (limited area) into the object distance and stored in the ROM 137. However, the predetermined area is not limited to the area based on the object distance, and may be determined by another method.

Next, in the step S605, the camera controller 141 detects the peak of the contrast evaluation value. At this time, the camera controller 141 performs peak detections for all AF frames regardless of the ValidFrame result. The peak detection is processing of calculating a focus position that provides the highest contrast using an evaluation value near the maximum value of the contrast evaluation value. In the step S605, the camera controller 141 determines a peak reliability based on the calculated peak level of the contrast evaluation value and the slope of the mountain shape.

Figure 7A:
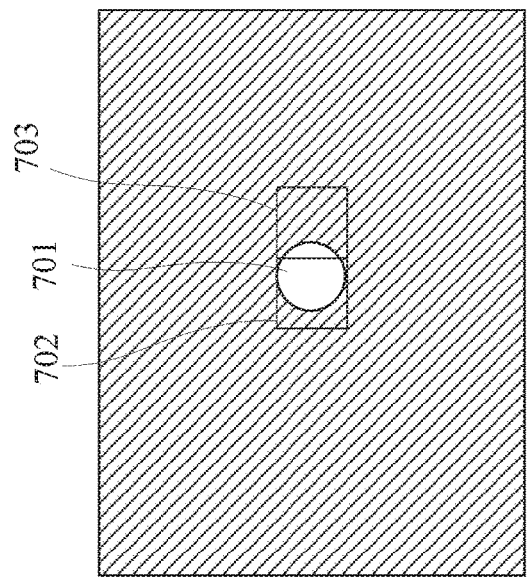
FIGS. 7A to 7C explain an object entry/exit determination in a frame according to each embodiment.
Figure 7B:
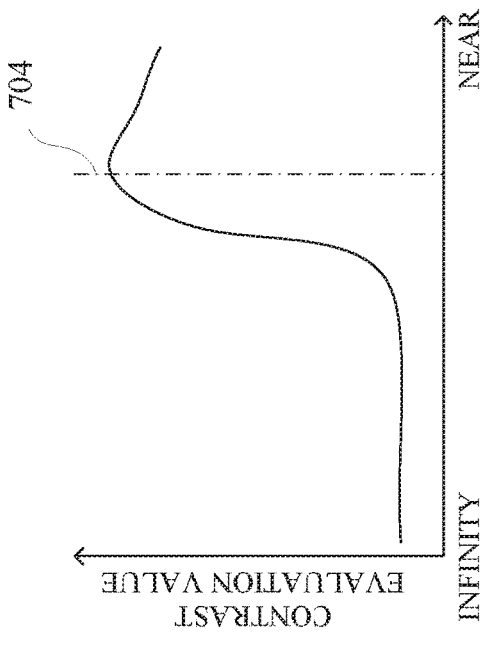
Figure 7C:
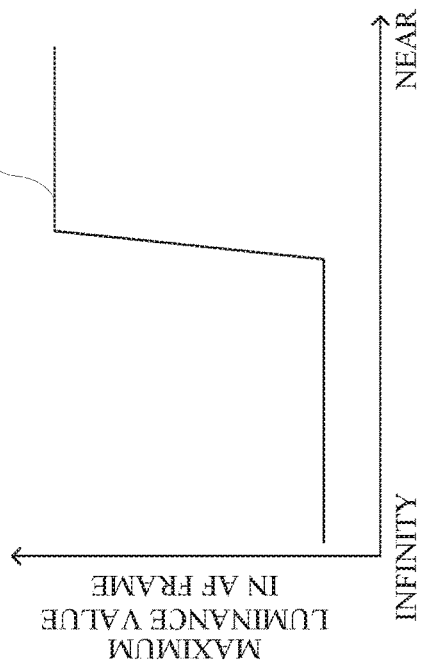

Next, in the step S606, the camera controller 141 determines whether or not the point light source enters and exits the frame. Referring now to FIGS. 7A to 7C, a description will be given of the entry/exit determination of the object (point light source) in/from the frame. FIGS. 7A-7C explain the determination of the entry/exit of the object (point light source) in/from the frame.

FIG. 7A illustrates an image blurred on the close side when a scanning operation is performed for a point light source (point light source area) 701. In FIG. 7A, reference numeral 702 denotes a central AF frame, and reference numeral 703 denotes an AF frame adjacent to the AF frame 702. FIG. 7B illustrates a graph in which the contrast evaluation value changes during the scan operation in the AF frame 703. In FIG. 7B, the abscissa axis represents a focus position, and the ordinate axis represents a contrast evaluation value. FIG. 7C illustrates a graph illustrating a change of the maximum luminance value in the AF frame 703. In FIG. 7C, the ordinate axis indicates a focus position, and indicates a maximum luminance value in the AF frame.

The point light source 701 tends to have a larger high-luminance area as it is out of focus than when it is in focus. Thus, as illustrated in FIG. 7A, when the point light source 701 existing in the AF frame 702 is blurred, it enters the adjacent AF frame 703. Then, the contrast evaluation value has a peak at a position indicated by a broken line 704 in FIG. 7B, and the erroneous determination of the highest contrast causes the blurred focus. Accordingly, in this embodiment, the camera controller 141 acquires the highest luminance value 705 in the AF frame as illustrated in FIG. 7C. Then, when the difference between the maximum value and the minimum value of the highest luminance value is equal to or higher than a predetermined value, the camera controller 141 performs reliability reducing processing of the corresponding AF frame. This processing can prevent the false focusing, even if the point light source 701 enters the frame.

Next, in the step S607 in FIG. 6, the camera controller 141 selects an AF frame (an AF frame having a higher reliability than a predetermined reliability) having the calculated peak position closest to the near side, from among the AF frames having the satisfactory reliabilities determined in the steps S605 and S606. Then, the camera controller 141 sets the peak position regarding the selected AF frame to the target position of the focus lens 114. In the step S608, the camera controller 141 drives the focus lens 114 to its target position via the lens controller 117 and the focus driver 116, and ends the AF operation.

Next follows a description of processing when the point light source AF is not performed. If the point light source_FLAG is FALSE in the step S602, the flow proceeds to the step S609. In the step S609, the camera controller 141 sets a spatial frequency filter in accordance with the By value (luminance). In other words, according to the By value, the camera controller 141 sets a high-pass filter (a filter for extracting the first band) in order to increase the AF accuracy when it is bright, and sets a low-pass filter (filter for extracting the second band) in order to reduce the influence of the noise when it is dark.

Next, in the step S610, the camera controller 141 determines whether or not the current focus lens 114 is located at a zone boundary. Herein, the zone is a mechanism for shortening the processing time of the scan operation, and is an area obtained by dividing the movable range of the focus lens 114 into a plurality of parts. If the focus lens 114 is not located at the zone boundary, the flow proceeds to the step S612. On the other hand, if the focus lens 114 is located at the zone boundary, the flow proceeds to the step S611. In the step S611, the camera controller 141 performs a zone update determination. In the zone update determination, the camera controller 141 determines whether the peak of the contrast evaluation value with the satisfactory reliability has already been detected and whether the contrast evaluation value has stopped climbing to the next zone. In the step S613, if the satisfactory reliability peak has not yet been found in the zone boundary, or if the contrast evaluation value has stopped climbing, the camera controller 141 determines to update the zone, and proceeds to the step S612. On the other hand, if the above condition is not satisfied, the camera controller 141 determines in the step S613 that the zone is not updated and proceeds to the step S614.

In the step S614, the camera controller 141 performs a peak detection for the AF frame in which ValidFrame is TRUE. In this embodiment, when the point light source is detected only in an AF frame other than the predetermined area (5×3 central frames) and thereby ValidFrame is FALSE, this embodiment performs no peak detection for the AF frame. Thereafter, the flow proceeds to the step S607, and the camera controller 141 determines a final focus position.

If determining that the focus lens 114 is not located at the zone boundary in the step S610 or that the zone is to be updated in the step S612, the camera controller 141 proceeds to the step S612. In the step S612, the camera controller 141 determines whether or not the current position (focus position) of the focus lens 114 is a scan end position. In this embodiment, the scan end position is the lens end on the near side. If the current focus position reaches the scan end position, the flow proceeds to the step S607. On the other hand, if the scan end position has not reached it, the flow proceeds to the step S615. In the step S615, the camera controller 141 drives the focus lens 114 by a predetermined amount and returns to the step S610.

This embodiment can focus on a target object with high accuracy while preventing false focusing due to the point light source.

Second Embodiment

Figure 8:
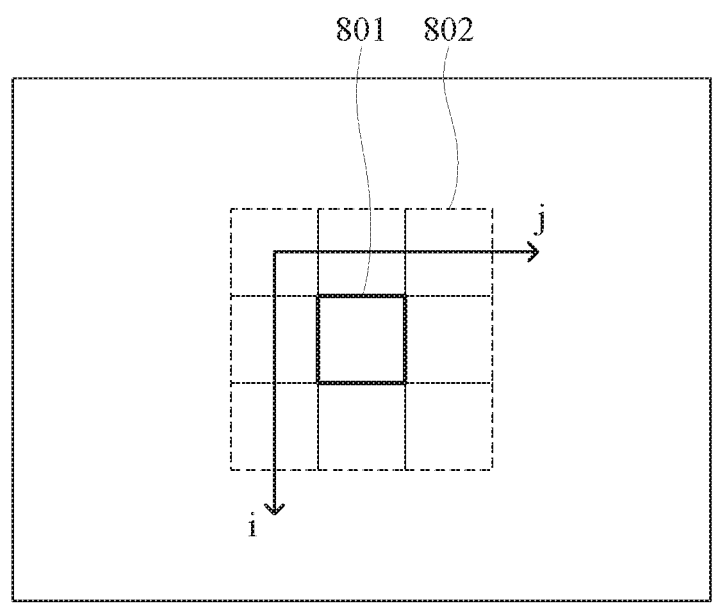
FIG. 8 explains AF frame setting according to the second embodiment.

Referring now to FIG. 8, a description will be given of a second embodiment according to the present invention. This embodiment is different from the first embodiment in AF frame setting method. Since the configuration of the imaging apparatus in this embodiment is the same as that illustrated in FIG. 1 in the first embodiment, a description thereof will be omitted. The processing flow of the AF operation is similar to that of the first embodiment described with reference to FIGS. 2, 4, and 6, and thus a description thereof will be omitted.

This embodiment will discuss a point light source countermeasure in the AF frame setting mode when the user sets the AF frame by a single point. FIG. 8 illustrates an AF frame when an AF frame is set by a single point for a low-luminance object. Reference numeral 801 denotes an AF frame that is actually displayed on the image. An AF frame 802 indicated by a broken line around the AF frame 801 is auxiliary frames for the AF frame 801. When the luminance is low, the signal level decreases and the noise level increases and the focus accuracy decreases. Accordingly, this embodiment increases the AF accuracy by using an auxiliary frame. More specifically, the AF accuracy can be improved by combining the result of the highly reliable auxiliary frame (AF frame 802) with the result of the AF frame 801 and by outputting the AF result.

A description will now be given of a difference in processing between this embodiment and the first embodiment due to the different AF frame to be set. More specifically, there are two differences. The first point is a first area that is set in the point light source determination. The second point is a method for determining entry/exit of the object in/from the frame.

A description will now be given of the first area in the point light source determination. In the step S402 in FIG. 4, the frame [i, j] is assigned with respect to an origin at the upper left frame as illustrated in FIG. 8. In this embodiment, the camera controller 141 sets only the central AF frame 801 to the first area for performing the determination in the step S408 (point light source detection frame number determination) in FIG. 4. In other words, when detecting the point light source in the AF frame 801, the camera controller 141 proceeds to the step S409. In the step S409, the camera controller 141 sets the point light source AF_FLAG to TRUE. On the other hand, when detecting no point light source in the AF frame 801, the camera controller 141 sets the light source AF_FLAG to FALSE.

A description will now be given of the entry/exit determination of the object in/from the frame. This embodiment excludes the center AF frame 801 from the determination target in determining whether the object enters or exits the frame in the step S606 in FIG. 6. The reason will be set forth as follows. In this embodiment, as described above, only when the point light source is detected in the central AF frame 801, the result in the step S602 becomes Yes, and thus the condition to proceed to the step S606 is that the point light source exists in the central AF frame 801 in advance. In the first AF frame having point light source, even if a new point light source enters, the contrast evaluation value does not significantly vary and the false focusing probability is considered to be low. Therefore, this embodiment excludes the center AF frame 801 from the frame entry/exit determination target.

This embodiment can focus on a target object with high accuracy while prevents the point light source from causing the false focusing when setting the AF frame with the single point.

Thus, in each embodiment, the control apparatus (camera controller 141) includes the determination unit 141a and the focus control unit 141b. The determination unit determines whether or not a point light source area exists in the image (image signal). The focus control unit performs a focus control based on evaluation values (contrast evaluation values) sequentially acquired from the image while moving the focus lens 114. The focus control unit changes the method of the focus control based on the position of the point light source area.

The determination unit may determine whether or not a point light source area exists in each of the first area (313) and the second area outside the first area of the image. The focus control unit may change the method of the focus control depending on whether the point light source area exists in the first area or only in the second area. When the point light source area exists in the first area, the focus control unit may set (limit) the movable range of the focus lens in sequentially acquiring the evaluation values to the first movable range (predetermined range). On the other hand, when the point light source area exists only in the second area, the focus control unit sets the movable range of the focus lens to a second movable range wider than the first movable range (or does not limit the movable range). The focus control unit may set the first movable range based on a focal length. The first movable range may be a predetermined range on the infinity side of the second movable range (predetermined ranges 306 and 311).

The first area may be located inside the entire area (AF frame 301) including all focus detection areas. The focus control unit may set a focus detection area having the main object to the first area. When the point light source area exists in the first area, the focus control unit may perform the filtering processing using a filter that extracts a frequency component of a first band. On the other hand, when the point light source area exists only in the second area, the focus control unit may select the filter that extracts the frequency component of the first band or a second band according to the luminance of the object and perform filtering processing.

The focus control unit may set a plurality of focus detection areas for detecting the focus state (in-focus state) of the focus lens, and select a main frame for acquiring the evaluation value from the plurality of focus detection areas. When the point light source area exists only in the second area, the focus control unit excludes a frame corresponding to the position of the point light source area among the plurality of focus detection areas from the main frame candidates. The focus control unit may determine the reliability of the in-focus position determined based on the evaluation value. When the point light source area exists in the first area, the focus control unit may determine a target position of the focus lens among the focus detection areas determined to be highly reliable among the plurality of focus detection areas. On the other hand, when the point light source area exists only in the second area, the focus control unit may determine the target position from the focus detection areas determined to have no point light source area and to be high reliable. The focus control unit may reduce the reliability of the focus detection area when the point light source area exists in the first area and the difference between the maximum value and the minimum value of the highest luminance value in the focus detection area is equal to or higher than a predetermined value.

The determination unit determines whether or not the point light source area exists, based on a ratio of the number of pixels having a luminance value (a signal having a predetermined level or higher) higher than a predetermined luminance value to a total number of pixels included in the predetermined area (focus detection area) in the image. The determination unit may determine that the point light source area exists when the ratio of the number of pixels is equal to or higher than a predetermined ratio. The determination unit may change the predetermined ratio based on the luminance of the object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Each embodiment can provide a control apparatus, an imaging apparatus, a control method, and a storage medium, each of which can focus on a main object with high accuracy when a point light source exists.

This application claims the benefit of Japanese Patent Application No. 2019-002255, filed on Jan. 10, 2019, which is hereby incorporated by reference herein in its entirety.

What is claimed is:

1. A control apparatus comprising:
a determination unit configured to determine whether or not a point light source area exists in an image; and
a focus control unit configured to perform a focus control based on a focus state of a focus lens acquired based on the image,
wherein the determination unit determines whether or not the point light source area exists in each of a first area and a second area outside of the first area of the image,
wherein the focus control unit changes a method of the focus control according to whether the point light source area exists in the first area or only in the second area, and
wherein at least one processor or circuit is configured to perform the function of at least one of the units.

2. The control apparatus according to claim 1, wherein the focus control unit sets a movable range of the focus lens to a first movable range in acquiring the focus state when the point light source area exists in the first area, and
wherein the focus control unit sets the movable range of the focus lens to a second movable range wider than the first movable range when the point light source area exists only in the second area.

3. The control apparatus according to claim 2, wherein the focus control unit sets the first movable range based on a focal length.

4. The control apparatus according to claim 2, wherein the first movable range is a predetermined range on an infinity side of the second movable range.

5. The control apparatus according to claim 1, wherein the first area is located inside an entire area including all focus detection areas.

6. The control apparatus according to claim 1, wherein the focus control unit sets a focus detection area where a main object exists to the first area.

7. The control apparatus according to claim 1, wherein the focus control unit performs filter processing using a filter that extracts a frequency component of a first band when the point light source area exists in the first area, and
wherein the focus control unit performs the filter processing by selecting a filter that extracts the frequency component of the first band or a second band according to a luminance of an object, when the point light source area exists only in the second area.

8. The control apparatus according to claim 1, wherein the focus control unit
sets a plurality of focus detection areas to detect the focus state of the focus lens,
selects a main frame from among the plurality of focus detection areas, and
excludes a frame corresponding to the position of the point light source area from candidates of the main frame from among the plurality of focus detection areas when the point light source area exists only in the second area.

9. The control apparatus according to claim 1, wherein the focus control unit
determines a reliability of an in-focus position determined based on the focus state,
determines a target area from among focus detection areas determined to have the reliability higher than a predetermined value among a plurality of focus detection areas, when the point light source area exists in the first area, and
determines the target area from the focus detection areas that are determined not to include the point light source area and to have the higher reliability, when the point light source area exists only in the second area.

10. The control apparatus according to claim 1, wherein the focus control unit lowers the reliability of a focus detection area when the point light source area exists in the first area and a difference between a maximum value and a minimum value of a highest luminance value in the focus detection area has a predetermined value or higher while moving the focus lens.

11. The control apparatus according to claim 1, wherein the determination unit determines whether or not the point light source area exists based on a ratio of the number of pixels having a luminance value higher than a predetermined luminance value to a total number of pixels included in a predetermined area of the image.

12. The control apparatus according to claim 11, wherein the determination unit determines that the point light source area exists when the ratio of the number of pixels is equal to or higher than a predetermined ratio.

13. The control apparatus according to claim 12, wherein the determination unit changes the predetermined ratio based on a luminance of an object.

14. An imaging apparatus comprising:
an image sensor configured to photoelectrically convert an optical image formed through an imaging optical system and to output image data; and
a control apparatus,
wherein the control apparatus includes:
a determination unit configured to determine whether or not a point light source area exists in an image; and
a focus control unit configured to perform a focus control based on a focus state of a focus lens acquired based on the image,
wherein the determination unit determines whether or not the point light source area exists in each of a first area and a second area outside of the first area of the image, and
wherein the focus control unit changes a method of the focus control according to whether the point light source area exists in the first area or only in the second area.

15. A control method comprising:
a determination step configured to determine whether or not a point light source area exists in an image; and
a focus control step configured to perform a focus control based on a focus state of a focus lens acquired based on the image,
wherein the determination step determines whether or not the point light source area exists in each of a first area and a second area outside of the first area of the image, and
wherein the focus control step changes a method of the focus control according to whether the point light source area exists in the first area or only in the second area.

16. A non-transitory computer-readable storage medium storing a program for causing a computer to execute a control method,
wherein the control method includes:
a determination step configured to determine whether or not a point light source area exists in an image; and
a focus control step configured to perform a focus control based on a focus state of a focus lens acquired based on the image,
wherein the determination step determines whether or not the point light source area exists in each of a first area and a second area outside of the first area of the image, and
wherein the focus control step changes a method of the focus control according to whether the point light source area exists in the first area or only in the second area.

* * * * *